March 29, 1938. G. K. BRADFIELD, JR 2,112,265
RECLINING SEAT MECHANISM
Filed Jan. 4, 1936   2 Sheets-Sheet 1
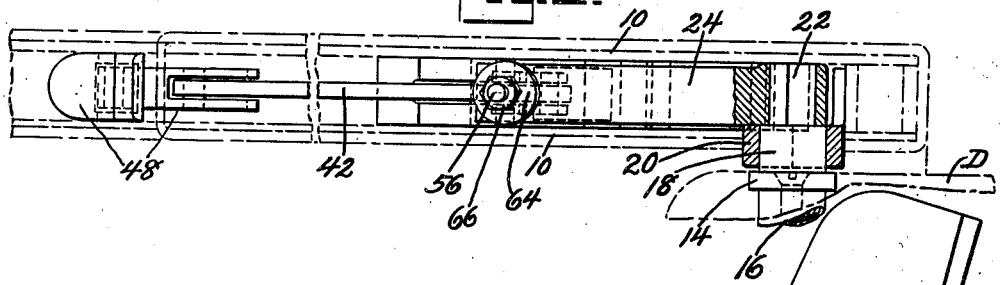
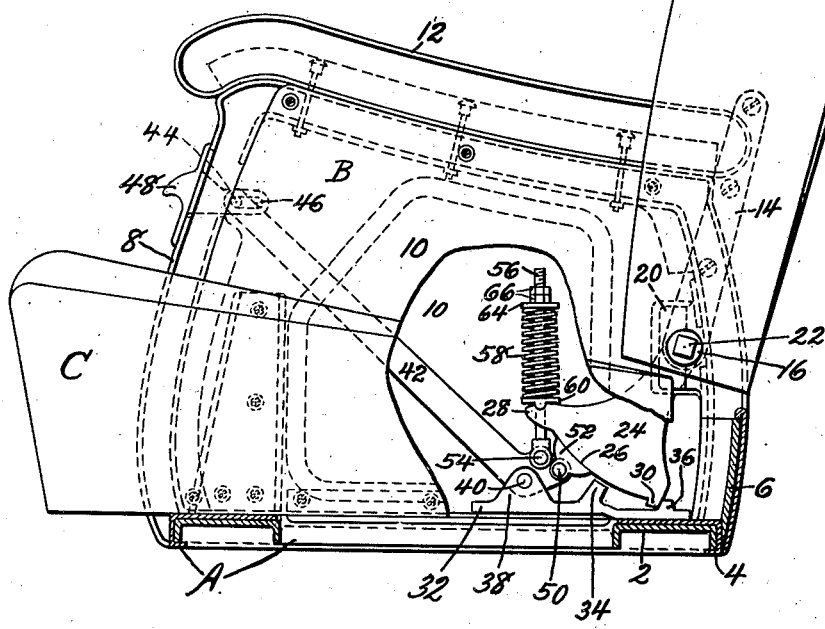
INVENTOR
George K. Bradfield, Jr.
BY
Donald U. Rich
ATTORNEY

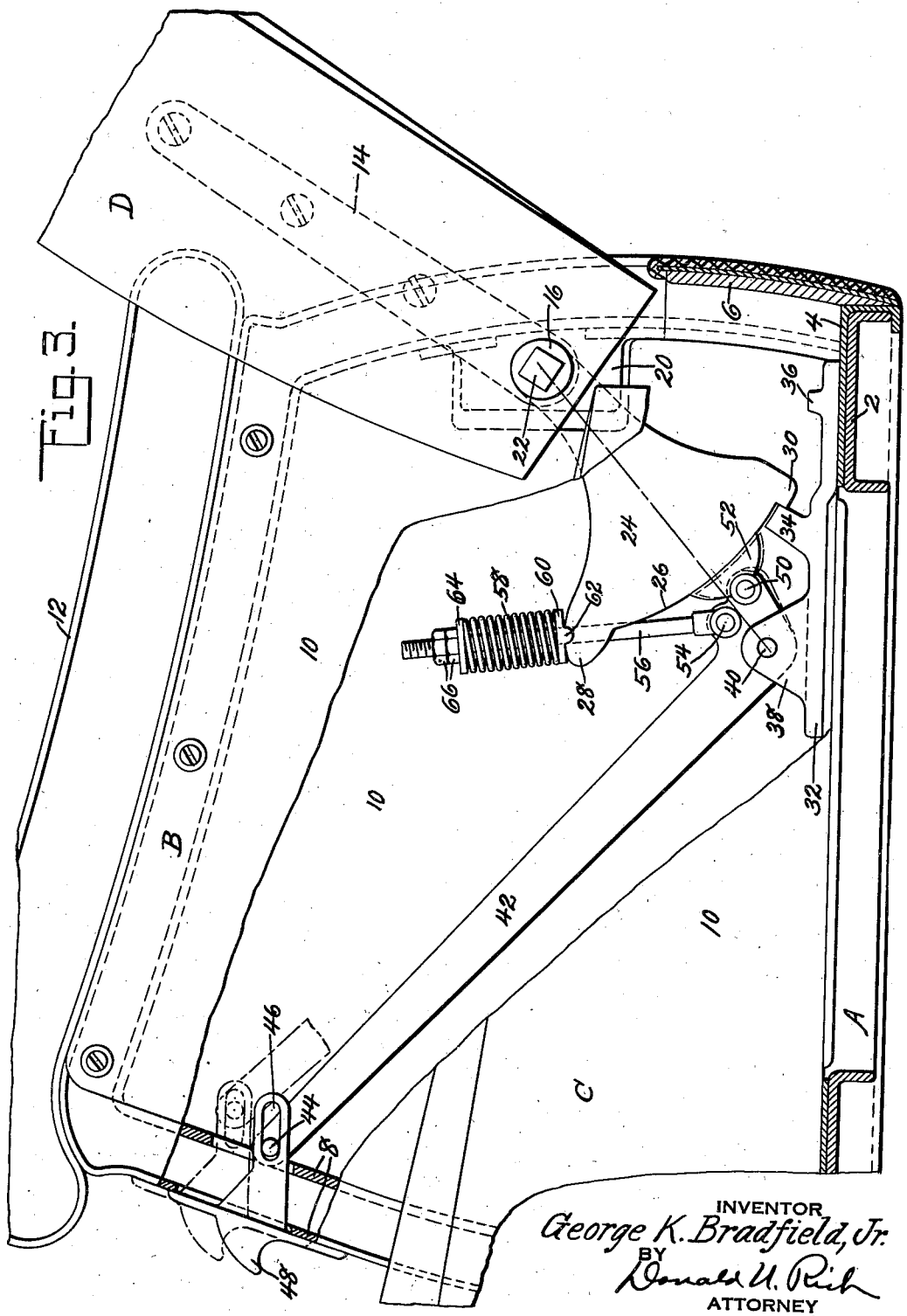

Patented Mar. 29, 1938

2,112,265

UNITED STATES PATENT OFFICE 2,112,265

RECLINING SEAT MECHANISM

George K. Bradfield, Jr., Hackensack, N. J., assignor to American Car and Foundry Company, New York, N. Y., a corporation of New Jersey Application January 4, 1936, Serial No. 57,493

8 Claims. (Cl. 155—161)

This invention relates to reclining seat backs in general and in particular to reclining seats intended for railway or motor vehicle use.

Previous reclining seat mechanisms have in general provided for but a limited number of positions of inclination of the seat back and have been cumbersome and liable to rattle in service. It is an object of the invention, therefore, to provide a reclining seat back mechanism which is simple and permits of an infinite number of positions of the back between certain limits.

Another object of the invention is the provision of a simple reclining seat mechanism which prevents rattling of the mechanism.

A further object of the invention is the provision of a reclining seat mechanism which frictionally holds the seat back in adjusted position.

A still further object of the invention is the provision of a reclining seat mechanism which more firmly grips the seat back with increased pressure on the back.

These and other objects of the invention will be apparent to one skilled in the art from a study of the following description and accompanying drawings in which:

Figure 1 is a side view of the seat with parts broken away to more clearly disclose the reclining mechanism;

Fig. 2 is a plan view of the seat side piece and shows the reclining mechanism in full lines, and Fig. 3 is an enlarged side view of the reclining mechanism with the back in reclining position.

Referring now to the drawings in detail, it is seen that the seat is formed with a frame A having side pieces B, between which is placed a cushion C and to which is pivoted the back D. The frame A is of conventional form, being formed of pressed members 2 and 4 and back cross tie 6 and upon this frame is mounted the side frames 8 to which are attached spaced plates 10 and arm rest 12. The spaced plates 10 provide an admirable location for the reclining mechanism later to be described.

The seat back is securely attached to arms 14 rigidly connected to trunnion shaft 16 having rounded portion or trunnion 18 journaled in bearing 20 connected to the side frame. The trunnion shaft 16 has a squared or similar shaped end 22 to non-rotatably receive control arm 24 which is situated between the spaced plates 10 for movement with the seat back of which it is practically an extension. The control arm is provided with a portion 26 curved substantially concentric with the seat back trunnion and which portion terminates at one end in a notched projection 28 and at the other end in a limiting projection 30.

A casting or forging 32 is connected to the base frame between the spaced side plates 10 and is formed with limiting stops 34 and 36 adapted to cooperate with the limiting projection on the control arm. The casting or forging is also formed with upstanding ears 38 adapted to receive pin 40 upon which is pivoted a brake control lever 42 carrying at one end a pin 44 adapted to slide in slot 46 of tripping finger 48 slidably mounted on the face of the seat side frame. The other end of the control lever carries one pin 50 upon which is pivotally mounted a brake shoe 52 adapted to frictionally engage the curved portion of the control arm and another pin 54 to which is connected a pull rod 56. A spring 58 surrounds the pull rod and has one end bearing on block 60 provided with raised part 62 resting in the notch of the control arm projection 28, while the other end bears against a washer 64 adjustably positioned with respect to the rod by nuts 66. The stored energy of the spring will thus act to set the brake to prevent movement of the seat back or with the brake removed will act to return the seat back to its more nearly vertical position. It should be noted also that the weight of the control lever and tripping finger aids the spring in setting the brake and it should be especially noted that the pivot pin 50 or brake shoe center is to one side of the line connecting the pin 40 and seat back trunnion 16 which will cause the brake shoe to more tightly grip the control arm when force is applied in a clockwise direction to the seat back as viewed in Fig. 3.

The operation of the seat back is as follows: Assuming the seat back to be in the upright position shown in Figure 1 wherein projection 30 engages stop 36 and brake 52 engages the control arm to prevent movement of the seat back, and it is desired to tilt the back, it is only necessary to lift trip finger 48 to the dotted position of Fig. 3 releasing the brake and permitting movement of the seat back. During movement of the seat back to an inclined position energy is stored in the spring which acts instantly to set the brake when the trip finger is released. The backward movement of the back is positively checked by projection 30 striking stop 34 but an infinite number of positions of the seat back may be selected between the limits set by the stops 34 and 36. Provided there is no clockwise acting pressure being applied to the seat back of Fig. 3, it is only necessary to lift trip finger 48 to remove the brake and the stored energy of the spring will return the seat back to the position shown in Fig. 1.

The seat back returning spring constantly acts to maintain the brake set and this spring action is aided by the weight of the lever which is of itself sufficient to set the brake and thus the seat will function even though the spring were to break, the only inconvenience being that the back would have to be manually moved to upright position. The relative location of the pivots 40, 50 and 18, or pivots 40, 18 and brake shoe center, insures an increased braking force under increased pressure applied to the seat back by an occupant of the seat and the weight of the control arm aided by the spring insures that the back will be firmly gripped to prevent rattling of the back under vibratory forces. It should also be noted that the spring serves as a common means not only to set the brake and return the seat back, but to maintain all connections under strain thus preventing the rattling of parts which is extremely objectionable and hard to avoid in motor vehicles.

The invention has been described in more or less detail but it is to be understood that this description is purely representative and that various modifications and arrangements of parts may be accomplished without departing from the scope of the appended claims.

What is claimed is:

1. In combination with a frame adapted to support a seat, a swinging seat back having a control arm rigidly connected therewith, trunnion means mounting said seat back on said frame, a control lever movably connected adjacent one end to said frame to present a long and short arm, a brake shoe pivotally connected to said short arm and coacting with said control arm, means connected to said short arm and bearing upon the control arm to yieldingly hold said brake shoe in gripping engagement with said control arm, and tripping means connected to said long arm for releasing said brake shoe from engagement with the control arm.

2. In combination with a frame adapted to support a seat, a swinging seat back having a control arm rigidly connected therewith, a control lever pivotally connected intermediate its ends to said frame to present a long and short arm, a brake shoe movably connected to said short arm and coacting with said control arm, and spring means connected to said control lever and control arm, said long arm and spring means acting together to normally yieldingly hold said brake shoe in gripping engagement with said control arm.

3. In combination with a frame adapted to support a seat, a swinging seat back having a control arm rigidly connected therewith, a control lever movably connected adjacent one end to said frame to present a long and short arm, a brake shoe connected to said short arm and coacting with said control arm, and means interconnecting said short arm and control arm, said means yieldingly holding said brake shoe in gripping engagement with said control arm and urging said seat back to upright position.

4. In combination with a frame adapted to support a seat, a swinging seat back having a control arm rigidly connected therewith, a control lever movably connected adjacent one end to said frame to present a long and short arm, a brake shoe connected to said short arm and coacting with said control arm, resilient means connected to said short arm and bearing upon said control arm, said resilient means yieldingly holding said brake shoe in gripping engagement with said control arm and urging said seat back to upright position.

5. In combination with a frame adapted to support a seat, a swinging seat back having a control arm rigidly connected therewith, a brake shoe coacting with said control arm, a control lever movably connected to said brake shoe and seat frame, and means interconnecting said lever and control arm, said means yieldingly holding said brake shoe in gripping engagement with said control arm and urging said seat back to upright position.

6. In combination with a frame adapted to support a seat, a swinging seat back having a control arm rigidly connected therewith, trunnion means mounting said back on said frame, a control lever movably connected adjacent one end to said frame to present a long and short arm, a brake shoe connected to said short arm and coacting with said control arm, said brake shoe center being located to one side of the line connecting said movable connection and trunnion means, means interconnecting said short arm and control arm, said last named means yieldingly holding said brake shoe in gripping engagement with said control arm and urging said seat back to upright position.

7. In combination with a frame for supporting a seat, a swinging seat back pivoted to the frame, a control arm rigidly connected to the seat back, a bell crank control lever pivotally connected intermediate its ends to said frame to provide a long arm and a short arm, a brake shoe pivoted to the short arm of said lever, and yielding means interconnecting the control lever and control arm in such a manner as to normally yieldingly hold the brake shoe in engagement with the control arm.

8. In combination with a seat supporting frame, a swinging seat back pivoted to said frame, a control arm rigidly connected to the seat back, a control lever pivotally connected intermediate its ends to the frame to provide a long arm and a short arm, the end portion of said short arm being arranged adjacent the control arm, a brake shoe connected to the short arm, and spring means interconnecting the control lever and control arm in such a manner as to normally yieldingly hold the brake shoe in engagement with the control arm.

GEORGE K. BRADFIELD, JR.